(12) United States Patent
Lee et al.

(10) Patent No.: US 12,576,916 B2
(45) Date of Patent: Mar. 17, 2026

(54) REINFORCEMENT RAIL FOR ROOF SIDE RAIL FOR VEHICLE AND ROOF SIDE RAIL ASSEMBLY WITH IMPROVED RIGIDITY USING THE SAME

(71) Applicants: Hyundai Motor Company, Seoul (KR); Kia Corporation, Seoul (KR); Daejoo Kores Co., Ltd., Wanju-gun (KR)

(72) Inventors: Sang-Il Lee, Seoul (KR); Jung-Uk Choo, Wanju-gun (KR)

(73) Assignees: HYUNDAI MOTOR COMPANY, Seoul (KR); KIA CORPORATION, Seoul (KR); DAEJOO KORES CO., LTD., Wanju-Gun (KR)

( * ) Notice: Subject to any disclaimer, the term of this patent is extended or adjusted under 35 U.S.C. 154(b) by 421 days.

(21) Appl. No.: 18/306,811

(22) Filed: Apr. 25, 2023

(65) Prior Publication Data

US 2024/0059357 A1     Feb. 22, 2024

(30) Foreign Application Priority Data

Aug. 22, 2022     (KR) ......................... 10-2022-0104866

(51) Int. Cl.
*B62D 25/04*          (2006.01)
*B62D 29/00*          (2006.01)
(52) U.S. Cl.
CPC ........... *B62D 25/04* (2013.01); *B62D 29/008* (2013.01)
(58) Field of Classification Search
CPC ............ B60Y 2304/03; B60Y 2306/01; B60Y 2410/12; B62D 21/15; B62D 25/02; B62D 25/04; B62D 25/06; B62D 27/02; B62D 29/008
See application file for complete search history.

(56) References Cited

U.S. PATENT DOCUMENTS

| | | | | |
|---|---|---|---|---|
| 4,561,690 | A * | 12/1985 | Shinjo .................... | B60J 5/0409 |
| | | | | 292/336 |
| 5,941,597 | A * | 8/1999 | Horiuchi ............. | B62D 29/001 |
| | | | | 296/193.06 |
| 11,267,518 | B2 * | 3/2022 | Takayanagi .......... | B62D 21/152 |
| 2014/0159432 | A1 * | 6/2014 | Kim ....................... | B62D 25/04 |
| | | | | 296/203.01 |
| 2017/0036703 | A1 * | 2/2017 | Maeda ................... | B62D 25/04 |

FOREIGN PATENT DOCUMENTS

| | | | |
|---|---|---|---|
| KR | 20080054904 A | 6/2008 | |
| WO | WO-0226550 A1 * | 4/2002 | ............. B62D 25/04 |

OTHER PUBLICATIONS

KR 20210064499 A (Year: 2021).*

* cited by examiner

*Primary Examiner* — Lori Lyjak
(74) *Attorney, Agent, or Firm* — SLATER MATSIL, LLP

(57)          ABSTRACT

A reinforcement rail for a roof side rail according to the present disclosure includes a first section having a predetermined thickness, a second section extending toward a lower side of a vehicle from an end of the first section based on a direction toward the outside of the vehicle, and a third section extending toward the lower side of the vehicle from an end of the first section based on a direction toward the inside of the vehicle, the third section being connected to a lower end of the second section, and the first section, the second section, and the third section define a closed cross-section.

18 Claims, 6 Drawing Sheets

1

100

REINFORCEMENT RAIL FOR ROOF SIDE RAIL FOR VEHICLE AND ROOF SIDE RAIL ASSEMBLY WITH IMPROVED RIGIDITY USING THE SAME

CROSS-REFERENCE TO RELATED APPLICATIONS

This application claims priority to Korean Patent Application No. 10-2022-0104866, filed on Aug. 22, 2022, which is incorporated herein by reference in its entirety.

TECHNICAL FIELD

The present disclosure relates to a roof side rail structure for a vehicle.

BACKGROUND

As illustrated in FIG. 1, a vehicle body of a typical vehicle 100 has a center pillar 115 that connects a roof side rail in and a side sill 114. The center pillar 115 serves as a structure disposed in a vertical direction of the vehicle and configured to connect the roof side rail in and the side sill 114.

In the case of small overlap related to a collision of a vehicle in a longitudinal direction, particularly a collision of a part of a front surface of a vehicle, the center pillar 115 supports a part of collision energy transferred through a lateral surface of the vehicle. In addition, the center pillar 115 also serves to support a roof of the vehicle in the event of a rollover accident of the vehicle.

A steel plate may be machined and joined to a vehicle body structure to which the center pillar 115 is applied, thereby improving rigidity of the center pillar 115 and thus exhibiting necessary rigidity. FIG. 2 illustrates a cross-section of the roof side rail 111 in the related art. The roof side rail in includes a roof side inner part 111a and a roof side outer part 111b connected to a roof panel 112, and a roof side reinforcement 113 is applied inside the roof side rail 111. Because the center pillar 115 is applied, required rigidity may be implemented by increasing a thickness of a steel plate or applying a high-tension steel plate.

Meanwhile, recently, the weight of the vehicle has been increased because of electrification of the vehicle. Therefore, the weight of the vehicle body structure of the vehicle needs to be decreased to improve electric power efficiency and increase a traveling distance. Therefore, studies have been actively conducted to maintain overall rigidity by eliminating some structures from the vehicle body in the related art and improving rigidity of the other structures.

In addition, as shapes of vehicles are diversified, there has been manufactured a vehicle that makes it easy for a user to conveniently get in or out of the vehicle by adopting a coach door or a sliding door without having the center pillar 115.

Further, with the development of autonomous driving, some of the seats may be configured as swivel seats so that occupants may be seated in the swivel seats while facing one another without a driver. The center pillar 115 may not be applied so that the swivel seat may rotate.

In case that the center pillar 115 is not applied as described above, there is a problem in that it is impossible to implement necessary rigidity only by increasing the thickness or strength of the steel plate.

SUMMARY

The present disclosure relates to a roof side rail structure for a vehicle, and more particularly, to a reinforcement rail for a roof side rail for a vehicle and a roof side rail assembly with improved rigidity using the same, which are capable of maintaining an interior space of a vehicle in the event of a collision or a rollover accident.

The present disclosure has been made in an effort to solve the above-mentioned problem, and an object of the present disclosure is to provide a reinforcement rail for a roof side rail for a vehicle and a roof side rail assembly with improved rigidity using the same, which are capable of allowing a roof side rail to exhibit rigidity in the event of a frontal collision or rollover accident of a vehicle.

To achieve the above-mentioned object, an embodiment of the present disclosure provides a reinforcement rail for a roof side rail for a vehicle, in which the reinforcement rail is provided between a roof side rail and a roof side reinforcement and disposed in a longitudinal direction of a vehicle, a cross-section of the reinforcement rail, which is perpendicular to the longitudinal direction of the vehicle, is formed as a closed cross-section having a hollow portion therein, and a thickness of the cross-section of the reinforcement rail varies along a periphery of the reinforcement rail.

The reinforcement rail may be coupled to the roof side reinforcement.

A portion of the reinforcement rail, which is coupled to the roof side reinforcement, may be smaller in thickness than the other portions of the reinforcement rail.

The reinforcement rail may include: a first section having a predetermined thickness; a second section extending toward a lower side of the vehicle from an end of the first section based on a direction toward the outside of the vehicle; and a third section extending toward the lower side of the vehicle from an end of the first section based on a direction toward the inside of the vehicle, the third section being connected to a lower end of the second section, and the first section, the second section, and the third section may define a closed cross-section.

The first section, the second section, and the third section may have different thicknesses in a peripheral direction of the reinforcement rail.

An average thickness of the third section may be smaller than an average thickness of the first section and an average thickness of the second section.

A portion of the reinforcement rail where the first and second sections are connected to each other may be thickest.

The third section may be coupled to the roof side reinforcement of the vehicle.

The reinforcement rail may further include a flange portion extending downward from a portion where the lower end of the second section is connected to a lower end of the third section.

The flange portion may have a constant thickness.

The reinforcement rail may be made of aluminum alloy.

The reinforcement rail may be manufactured by extrusion.

Another embodiment of the present disclosure provides a roof side rail assembly with improved rigidity to which a reinforcement rail for a roof side rail for a vehicle is applied, the roof side rail assembly including: a roof side rail disposed at each of two opposite ends of a roof panel of a vehicle and provided in a longitudinal direction of the vehicle, the roof side rail being joined to a roof side inner part and a roof side outer part; a roof side reinforcement joined to an inner side of the roof side rail; and a reinforcement rail positioned between the roof side rail and the roof side reinforcement and having a hollow cross-section, the reinforcement rail being installed in the longitudinal direction of the vehicle and coupled to at least any one of the roof side rail and the roof side reinforcement.

The reinforcement rail may include: a first section having a predetermined thickness; a second section extending toward a lower side of the vehicle from an end of the first section based on a direction toward the outside of the vehicle; and a third section extending toward the lower side of the vehicle from an end of the first section based on a direction toward the inside of the vehicle, the third section being connected to a lower end of the second section, and a cross-section of the reinforcement rail, which is perpendicular to the longitudinal direction of the vehicle, may be formed as a closed cross-section by the first section, the second section, and the third section.

An average thickness of the third section of the reinforcement rail may be smaller than an average thickness of the first section and an average thickness of the second section.

The third section may be coupled to the roof side reinforcement.

The reinforcement rail may further include a flange portion extending downward from the lower end of the second section and a lower end of the third section, and the flange portion may be coupled to the roof side reinforcement and the roof side inner part.

The flange portion may be coupled to the roof side reinforcement and the roof side inner part by means of a self-piercing rivet (SPR).

The first and second sections may be spaced apart from an inner surface of the roof side inner part at a predetermined interval.

No center pillar for connecting the roof side rail and a side sill may be provided between the roof side rail and the side sill.

According to the reinforcement rail for a roof side rail for a vehicle and the roof side rail assembly with improved rigidity using the same according to the present disclosure configured as described above, the rigidity of the roof side rail may be improved, such that the rigidity in the longitudinal direction of the vehicle is improved in the event of a frontal collision (particularly, small overlap) of the vehicle.

Further, the improvement of the rigidity of the roof side rail may improve the rigidity of the roof and prevent the roof from being compressed.

The rigidity of the vehicle in the longitudinal direction of the vehicle and the rigidity of the roof are improved, which makes it possible to ensure the maximum interior space of the vehicle in the event of a collision or rollover accident of the vehicle and thus reduce injuries to occupants caused by damage to the vehicle body.

Further, the center pillar may be eliminated, which makes it possible to implement vehicle bodies having various shapes and reduce the weight of the vehicle.

Furthermore, the rigidity of the vehicle body, which is required for a collision test or a roof rigidity test, may be exhibited even though the center pillar is eliminated.

DETAILED DESCRIPTION OF ILLUSTRATIVE EMBODIMENTS

Hereinafter, embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

Hereinafter, a reinforcement rail for a roof side rail for a vehicle and a roof side rail assembly with improved rigidity using the same according to the present disclosure will be described in detail with reference to the accompanying drawings.

Figure 1:
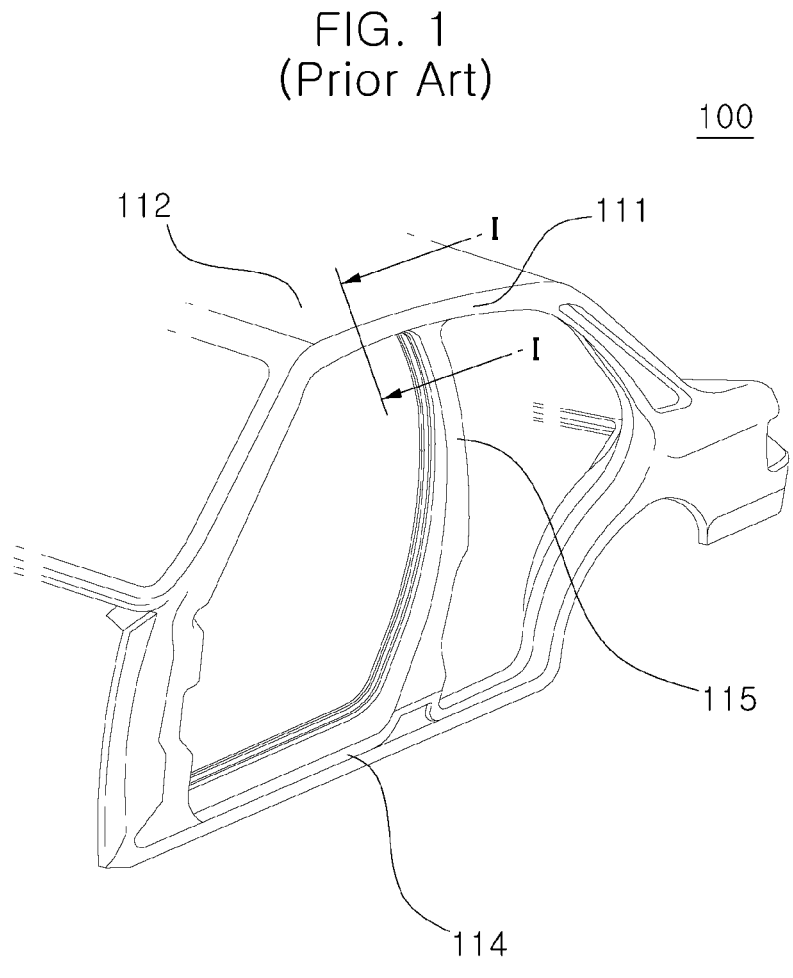
FIG. 1 is a perspective view illustrating a lateral structure of a vehicle body in the related art.
Figure 2:
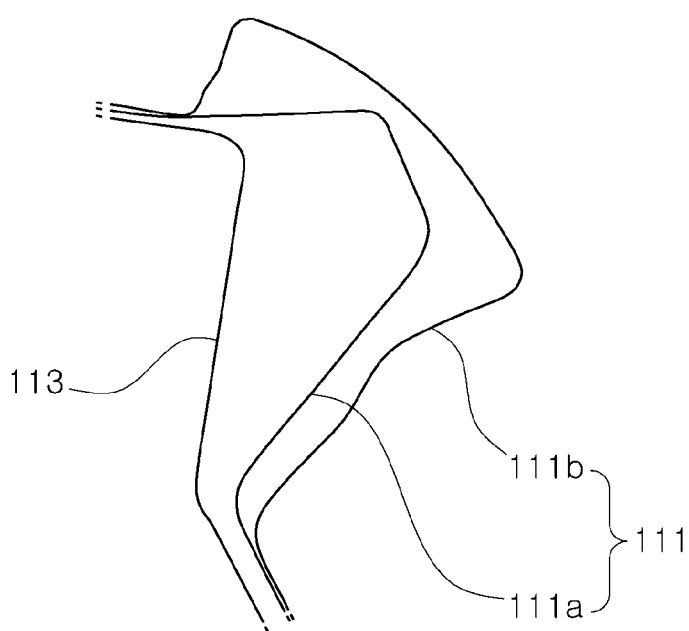
FIG. 2 is a cross-sectional view taken along line I-I in FIG. 1.
Figure 3:
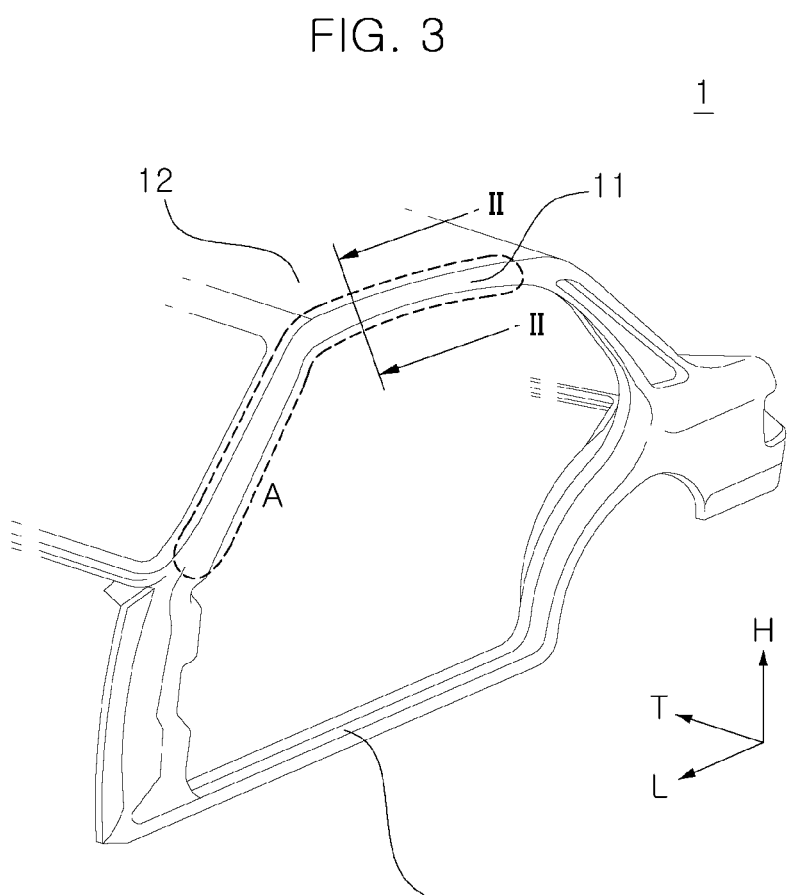
FIG. 3 is a perspective view illustrating a lateral structure of a vehicle body to which a roof side rail assembly with improved rigidity according to the present disclosure is applied.
Figure 4:
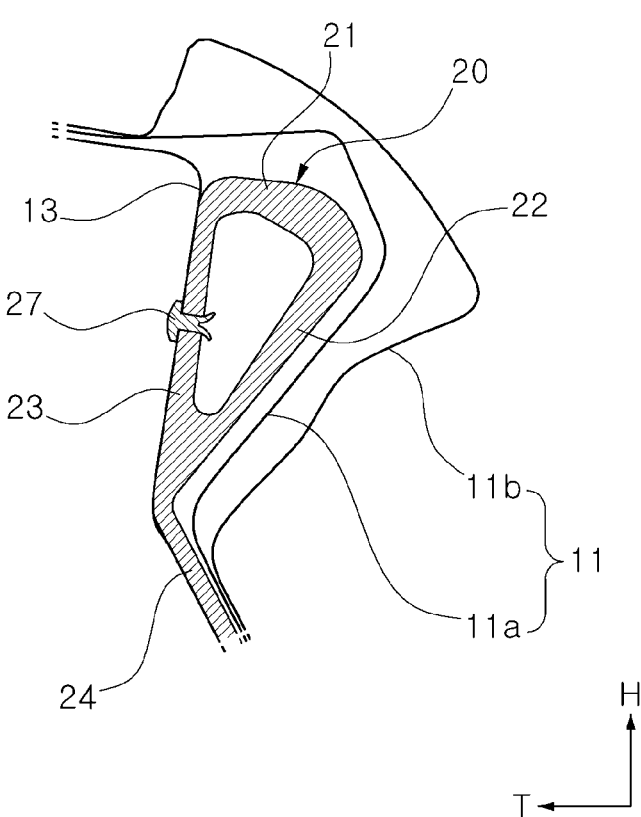
FIG. 4 is a cross-sectional view of the roof side rail assembly to which a reinforcement rail for a roof side rail for a vehicle according to the present disclosure is applied.

FIG. 3 is a perspective view illustrating a lateral structure of a vehicle body to which a roof side rail assembly with improved rigidity according to the present disclosure is applied. FIG. 4 is a cross-sectional view of the roof side rail assembly to which a reinforcement rail for a roof side rail for a vehicle according to the present disclosure is applied.

A reinforcement rail 20 for a roof side rail for a vehicle according to the present disclosure includes: a first section 21 having a predetermined thickness; a second section 22 extending toward a lower side of a vehicle 1 from an end of the first section 21 based on a direction toward the outside of the vehicle 1; and a third section 23 extending toward the lower side of the vehicle 1 from an end of the first section 21 based on a direction toward the inside of the vehicle 1, the third section 23 being connected to a lower end of the second section 22. The first section 21, the second section 22, and the third section 23 define a closed cross-section.

The reinforcement rail 20 is joined to a roof side rail 11 and a roof side reinforcement 13 to constitute a roof side rail assembly, such that a side portion of a roof of the vehicle 1 has a robust structure.

The reinforcement rail 20 may be applied to part A illustrated in FIG. 3. That is, the reinforcement rail 20 may be applied from a front end of the roof side rail 11 to a portion of the roof side rail 11 that is connected to a rear pillar.

The reinforcement rail 20 according to the present disclosure is applied to each of two opposite ends of a roof structure of the vehicle 1.

A side of the roof includes: the roof side rail 11 disposed at each of two opposite ends of a roof panel 12 of the vehicle and provided in a longitudinal direction L of the vehicle; and the roof side reinforcement 13 positioned inside the roof side rail 11 and configured to reinforce rigidity of the lateral surface of the roof. The roof side rail 11 is made by joining a roof side inner part 11a and a roof side outer part 11b. The side of the roof exhibits rigidity as the roof side inner part 11a, the roof side outer part 11b, and the roof side reinforcement 13 are joined to one another while each defining a cross-section with a curve.

However, in a structure in which a center pillar for connecting the roof side rail 11 and a side sill 14 is not provided, the rigidity may deteriorate because of the absence of the center pillar.

Therefore, in the present disclosure, the reinforcement rail 20 is provided between the roof side reinforcement 13 and the roof side rail 11 and disposed in the longitudinal direction of the vehicle 1. A cross-section of the reinforcement rail 20, which is perpendicular to the longitudinal direction of the vehicle 1, is formed as a closed cross-section having a hollow portion therein. The cross-section of the reinforcement rail 20 varies in thickness along a periphery of the reinforcement rail 20.

Because the reinforcement rail 20 is provided between the roof side reinforcement 13 and the roof side rail 11, particularly, provided in a space between the roof side reinforcement 13 and the roof side inner part 11a and disposed in the longitudinal direction of the vehicle 1, the reinforcement rail 20 may additionally reinforce the rigidity.

Therefore, in the event of a frontal collision (particularly, small overlap) of the vehicle or a rollover accident of the vehicle, the interior space of the vehicle 1 may be maximally maintained even though the center pillar is not provided, which makes it possible to reduce injuries to the occupant.

The shape of the reinforcement rail 20 will be described in detail. The reinforcement rail 20 includes the first section 21 positioned at an upper side of the reinforcement rail 20, the second section 22 extending downward from the end of the first section 21 based on the direction toward the outside of the vehicle 1, and the third section 23 extending downward from the end of the first section 21 based on the direction toward the inside of the vehicle 1 and having a lower end connected to the lower end of the second section 22. Because the first section 21, the second section 22, and the third section 23 are connected to one another, the reinforcement rail 20 has a curved closed cross-section.

The first section 21 is positioned at the upper side of the reinforcement rail 20 and has a predetermined thickness. An outer end of the first section 21 based on a width direction T of the vehicle 1 is connected to the second section 22, and an inner end of the first section 21 is connected to the third section 23.

The second section 22 extends downward from the outer end of the first section 21. The second section 22 is inclined downward toward the inside of the vehicle 1 with respect to a height direction H.

The third section 23 extends downward from the inner end of the first section 21. The third section 23 extends downward from an approximately upper end thereof in a direction perpendicular to the ground surface. The lower end of the third section 23 is connected to the lower end of the second section 22.

The reinforcement rail 20 includes the first section 21, the second section 22, and the third section 23 and thus has an approximately triangular shape.

The thickness of the reinforcement rail 20 varies along the periphery of the reinforcement rail 20. That is, the first section 21, the second section 22, and the third section 23 have different thicknesses along the periphery of the reinforcement rail 20. An average thickness of the third section 23 is smaller than an average thickness of the first section 21 and an average thickness of the second section 22, such that the third section 23 has the smallest thickness. The first section 21 is thicker than the second section 22.

Figure 5:
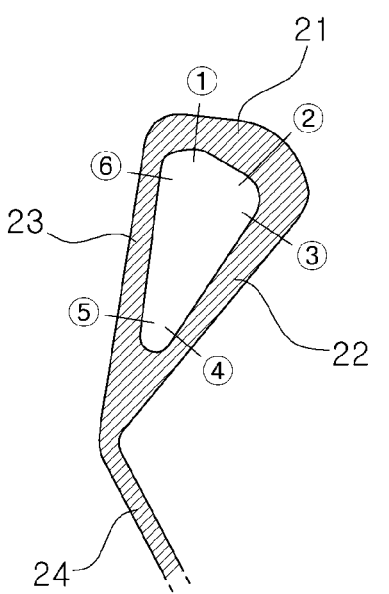
FIG. 5 is a cross-sectional view illustrating the reinforcement rail for a roof side rail for a vehicle according to the embodiment of the present disclosure.

In addition, the thickness of each of the sections 21, 22, and 23 varies. For example, the first section 21 becomes thicker in the direction toward the outside of the vehicle. In FIG. 5, a part indicated by ② is thicker than a part indicated by ①. For example, the part indicated by ① may have a thickness of 5 mm, and the part indicated by ② may have a thickness of 8 mm. The second section 22 becomes thinner downward. In FIG. 5, a thickness of the second section 22 decreases downward. For example, a part indicated by ③ has a thickness of 6 mm, and a part indicated by ④ has a thickness of 3.5 mm. The third section 23 becomes thinner upward. In FIG. 5, a part indicated by ⑥ is thinner than a part indicated by ⑤. For example, the part indicated by ⑤ may have a thickness of 4 mm, and the part indicated by ⑥ may have a thickness of 3 mm.

In the reinforcement rail 20, the first section 21 and the second section 22 have large thicknesses, such that the rigidity of the part to which impact is directly applied in the event of a rollover accident of the vehicle may be improved, which makes it possible to protect the occupant.

The thickest part of the reinforcement rail 20 is a portion of the reinforcement rail 20 where the first section 21 and the second section 22 are connected to each other. That is, an outer side of an upper portion of the reinforcement rail 20 is thickest.

The reinforcement rail 20 is coupled to the roof side reinforcement 13 by means of the third section 23. That is, the third section 23 is coupled to the roof side reinforcement 13 by means of a fastening member such as a rivet 27.

The first and second sections 21 and 22 of the reinforcement rail 20 are spaced apart, at a predetermined interval, from an inner surface of the roof side rail 11, i.e., an inner surface of the roof side inner part 11a.

The interval allows the roof side rail 11 to be deformed while absorbing a part of an impact force in the event of a rollover accident of the vehicle 1, such that the roof side rail 11 adjoins the reinforcement rail 20, thereby implementing a robust structure.

The reinforcement rail 20 further includes a flange portion 24. The flange portion 24 extends downward from a portion where the lower end of the second section 22 is connected to the lower end of the third section 23. The flange portion 24 has a constant thickness.

In the reinforcement rail 20, the first section 21, the second section 22, the third section 23, and the flange portion 24 are integrated together. Therefore, the reinforcement rail 20 may be manufactured by extrusion.

In particular, the reinforcement rail 20 may be made of aluminum alloy so that the weight of the reinforcement rail 20 is reduced. That is, the reinforcement rail 20 is manufactured by extrusion using aluminum alloy.

Figure 6:
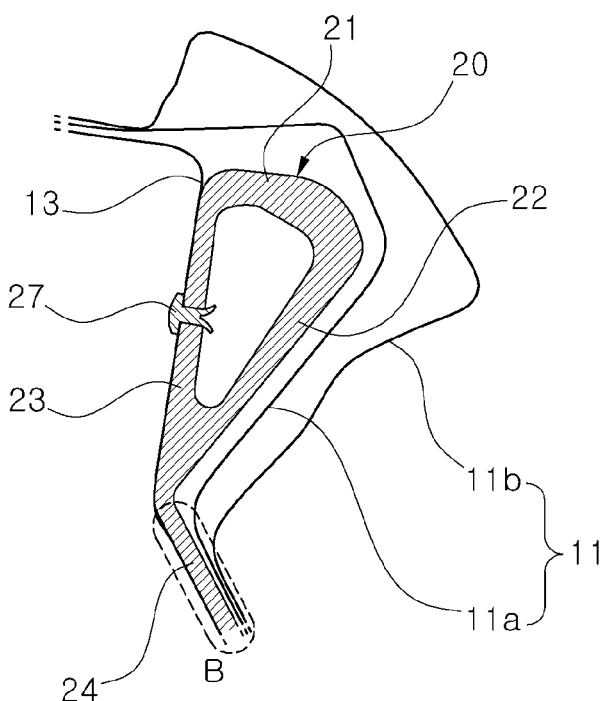
FIG. 6 is a cross-sectional view illustrating a portion of the reinforcement rail for a roof side rail for a vehicle according to the present disclosure that is coupled to the roof side rail assembly by means of an SPR.

Meanwhile, unlike the reinforcement rail 20, the roof side inner part 11a, the roof side outer part 11b, and the roof side reinforcement 13 may each be made by a steel plate. Therefore, the reinforcement rail 20 is not joined by welding, which is a method of joining the roof side inner part 11a, the roof side outer part 11b, and the roof side reinforcement 13. The flange portion 24 is coupled to the roof side reinforcement 13 and the roof side inner part 11a by means of a self-piercing rivet (SPR). Because the reinforcement rail 20 is different in material from the other members, the reinforcement rail 20 cannot be joined to the other members by welding. Therefore, the reinforcement rail 20 is coupled to the other members by using the SPR. The flange portion 24 is coupled to the roof side reinforcement 13 and the roof side inner part 11a by using the SPR at part B illustrated in FIG. 6.

In particular, because the flange portion 24 has a constant thickness, the flange portion 24 is coupled to the roof side reinforcement 13 and the roof side inner part 11a by using the SPR in a state in which the flange portion 24 is positioned between the roof side reinforcement 13 and the roof side inner part 11a.

As described above, the reinforcement rail 20 may improve the rigidity of the side of the roof including the roof side rail 11 and the roof side reinforcement 13. Therefore, because the reinforcement rail 20 improves the rigidity of the side of the roof, the rigidity required by the vehicle body of the vehicle 1 may be exhibited even though the center pillar for connecting the roof side rail 11 and the side sill 14 is eliminated to reduce the weight of the vehicle and apply a coach door and a swivel seat.

What is claimed is:

1. A rail for a vehicle, comprising:
a reinforcement rail between a roof side rail and a roof side reinforcement of the vehicle, wherein the reinforcement rail is disposed in a longitudinal direction of the vehicle;
a cross-section of the reinforcement rail, wherein:
the cross-section is perpendicular to the longitudinal direction of the vehicle,
the cross-section is a closed cross-section having a hollow portion therein, and
a thickness of the cross-section of the reinforcement rail varies along a periphery of the reinforcement rail,
wherein:
the reinforcement rail comprises:
a first section having a predetermined thickness;
a second section extending toward a lower side of the vehicle from a first end of the first section based on a first direction toward an outside of the vehicle; and
a third section extending toward the lower side of the vehicle from a second end of the first section based on a second direction toward an inside of the vehicle,
the third section is connected to a first lower end of the second section, and
the first section, the second section, and the third section define the closed cross-section.

2. The rail of claim 1, wherein the reinforcement rail is coupled to the roof side reinforcement.

3. The rail of claim 2, wherein a portion of the reinforcement rail, which is coupled to the roof side reinforcement, has a smaller thickness than other portions of the reinforcement rail.

4. The rail of claim 1, wherein the first section, the second section, and the third section have different thicknesses in a peripheral direction of the reinforcement rail.

5. The rail of claim 1, wherein a first average thickness of the third section is smaller than a second average thickness of the first section and a third average thickness of the second section.

6. The rail of claim 1, wherein a portion of the reinforcement rail where the first and second sections are connected to each other is a thickest portion of the reinforcement rail.

7. The rail of claim 1, wherein the third section is coupled to the roof side reinforcement of the vehicle.

8. The rail of claim 1, further comprising:
a flange portion extending downward from a portion where the first lower end of the second section is connected to a second lower end of the third section.

9. The rail of claim 8, wherein the flange portion has a constant thickness.

10. The rail of claim 1, wherein the reinforcement rail is made of aluminum alloy.

11. The rail of claim 1, wherein the reinforcement rail is manufactured by extrusion.

12. A roof side rail assembly, comprising:
a roof side rail disposed at each of two opposite ends of a roof panel of a vehicle and provided in a longitudinal direction of the vehicle, the roof side rail being joined to a roof side inner part and a roof side outer part;
a roof side reinforcement joined to an inner side of the roof side rail; and
a reinforcement rail between the roof side rail and the roof side reinforcement and having a hollow cross-section, the reinforcement rail extending in the longitudinal direction of the vehicle and coupled to at least any one of the roof side rail and the roof side reinforcement,
wherein:
the reinforcement rail comprises:
a first section having a predetermined thickness;
a second section extending toward a lower side of the vehicle from a first end of the first section based on a first direction toward an outside of the vehicle; and
a third section extending toward the lower side of the vehicle from a second end of the first section based on a second direction toward an inside of the vehicle,
the third section is connected to a first lower end of the second section, and
a cross-section of the reinforcement rail, which is perpendicular to the longitudinal direction of the vehicle, is a closed cross-section closed by the first section, the second section, and the third section.

13. The roof side rail assembly of claim 12, wherein a first average thickness of the third section of the reinforcement rail is smaller than a second average thickness of the first section and a third average thickness of the second section.

14. The roof side rail assembly of claim 13, wherein the third section is coupled to the roof side reinforcement.

15. The roof side rail assembly of claim 12, wherein:
the reinforcement rail further comprises a flange portion extending downward from the first lower end of the second section and a second lower end of the third section, and
the flange portion is coupled to the roof side reinforcement and the roof side inner part.

16. The roof side rail assembly of claim 15, wherein the flange portion is configured to be coupled to the roof side reinforcement and the roof side inner part by a self-piercing rivet (SPR).

17. The roof side rail assembly of claim 12, wherein the first and second sections are spaced apart from an inner surface of the roof side inner part at a predetermined interval.

18. The roof side rail assembly of claim 12, wherein no center pillar for connecting the roof side rail and a side sill is between the roof side rail and the side sill.

* * * * *